(12) United States Patent
Morimoto et al.

(10) Patent No.: US 6,246,145 B1
(45) Date of Patent: Jun. 12, 2001

(54) BRUSH HOLDER

(75) Inventors: Yoshihiro Morimoto; Shigeru Shiroyama, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/367,915

(22) PCT Filed: May 26, 1997

(86) PCT No.: PCT/JP97/01767

§ 371 Date: Aug. 23, 1999

§ 102(e) Date: Aug. 23, 1999

(87) PCT Pub. No.: WO98/54820

PCT Pub. Date: Nov. 3, 1998

(51) Int. Cl.$^7$ .................................................. H02K 13/00
(52) U.S. Cl. .......................... 310/245; 310/239; 310/242
(58) Field of Search .................................. 310/238, 239, 310/242, 245

(56) References Cited

U.S. PATENT DOCUMENTS

| | | | |
|---|---|---|---|
| 5,148,072 | 9/1992 | Shiroyama | 310/239 |
| 5,717,271 | * 2/1998 | Aoki et al. | 310/242 |
| 5,773,907 | * 6/1998 | Rubinchik | 310/248 |
| 6,005,323 | * 12/1999 | Morimoto et al. | 310/239 |
| 6,144,134 | * 11/2000 | Lin | 310/239 |

FOREIGN PATENT DOCUMENTS

| | | |
|---|---|---|
| 58-70073 | 5/1983 | (JP) . |
| 63-83969 | 6/1988 | (JP) . |
| 3-18658 | 2/1991 | (JP) . |
| 5-60154 | 8/1993 | (JP) . |
| 7-322559 | 12/1995 | (JP) . |

* cited by examiner

*Primary Examiner*—Nestor Ramirez
*Assistant Examiner*—Judson H. Jones
(74) *Attorney, Agent, or Firm*—Sughrue, Mion, Zinn, Macpeak & Seas, PLLC

(57) ABSTRACT

The present invention provides a brush holder assembly enabling a common brush holder frame to be used regardless of the direction in which a lead is to pass out, improving productivity and preventing decreases in quality due to the incorrect mounting of parts, etc.

A plurality of brush holder frames are secured to a base such that the openings of respective brush receiving recesses face a passage and the axes of the brush receiving recesses are directed towards the central axis of the passage. Lead outlet grooves are disposed in both sides of each of the brush holder frames so that each extends from a first end towards a second end and joins the respective brush receiving recess to the outside. Brushes are inserted into the brush receiving recesses so that leads attached to the side thereof pass through one of the lead outlet grooves in said brush holder frames and are held by each of the brush holder frames.

3 Claims, 3 Drawing Sheets

BRUSH HOLDER

TECHNICAL FIELD

The present invention relates to improvements to a brush holder assembly for use in a direct-current electric motor.

BACKGROUND ART

An example of a conventional brush holder assembly for use in a direct-current electric motor is disclosed in Japanese Utility Model Laid-Open No. HEI 3-18658. The construction of the conventional brush holder assembly will be explained below with reference to FIGS. 4 to 7.

The brush holder assembly comprises a pair of negative-side brush holder frames 2a, 2b and a pair of positive-side brush holder frames 3a, 3b fastened to a base 4.

The base 4 is a steel plate formed into an annulus having a central opening 4a being designed to allow passage of a commutator 1. A plurality of positioning holes 20 are disposed on the base 4. In addition, a plurality of tabs 21 are provided by press working part of the base 4.

Furthermore, the brush holder frames 2a, 2b, 3a, 3b are molded from electrically-insulating synthetic resin.

Brush receiving recesses 22 are disposed in brush holder frames 2a, 3b, respectively, so as to extend from a first end towards a second end without penetrating the second end. Furthermore, pairs of flanges 23 are disposed such that each extends outwards from the bottom end on either side. Fastening slots 24 are disposed on each pair of flanges 23. Furthermore, a lead outlet groove 25 is disposed on one side so as to extend from the first end towards the second end and join the brush receiving recess 22 to the outside. Furthermore, a plurality of protrusions 26 for positioning are disposed on the bottom surface. In addition, a plurality of radiator openings 27 are provided.

On the other hand, brush holder frames 2b, 3a are constructed similarly to brush holder frames 2a, 3b above, except that the lead outlet groove 25 is disposed on the opposite side of each so as to extend from the first end towards the second end and join the brush receiving recess 22 to the outside.

The brush holder frames 2a, 2b, 3a, 3b are fastened onto the base 4 by inserting the protrusions 26 into the positioning holes 20 so as to allow the tabs 21 to pass through the fastening slots 24 and bending the tips of the tabs 21 projecting from the fastening slots 24. At that point, the brush holder frames 2a, 2b, 3a, 3b are fastened to the base 4 such that the open ends of the brush receiving recesses 22 each face the central opening 4a of the base 4 and the axes of the brush receiving recesses 22 pass through the central axis of the central opening 4a of the base 4. By inserting the protrusions 26 into the positioning holes 20, movement of the brush holder frames 2a, 2b, 3a, 3b in the radial direction and in the direction of rotation is controlled. Furthermore, the tabs 21 securing each of the brush holder frames are bent in mutually opposite radial directions, preventing the brush holder frames from dislodging longitudinally.

Negative-side brushes 5a, 5b are inserted into the brush receiving recesses 22 of brush holder frames 2a, 2b, respectively, by passing negative-side leads 7a, 7b through the lead outlet grooves 25. Similarly, positive-side brushes 6a, 6b are inserted into the brush receiving recesses 22 of brush holder frames 3a, 3b, respectively, by passing positive-side leads 8a, 8b through the lead outlet grooves 25. The brushes 5a, 5b, 6a, 6b are placed in contact with the outer circumferential surface of the commutator 1 inserted through the central opening 4a of the base 4 by the force of brush springs 9 disposed within each of the brush receiving recesses 22.

The negative-side leads 7a, 7b connected to the negative-side brushes 5a, 5b are grounded by connection to the base by welding, etc. On the other hand, the positive-side leads 8a, 8b connected to the positive-side brushes 6a, 6b are connected to a power source (not shown) by means of a connector 11. The positive-side leads 8a, 8b are covered with insulating tubing 10 to prevent electrical short-circuiting with the base 4.

This brush holder assembly is mounted onto an end bracket of a direct-current electric motor using screw holes 12 disposed in the base 4.

In the conventional brush holder assembly, as shown in FIG. 4, a negative-side leads 7a passes out of a negative-side brush holder frame 2a in a counter-clockwise direction, and a negative-side lead 7b passes out of a negative-side brush holder frame 2b in a clockwise direction.

On the other hand, a positive-side lead 8a passes out of a positive-side brush holder frame 3a in a clockwise direction, and a positive-side lead 8b passes out of a positive-side brush holder frame 3b in a counter-clockwise direction. In other words, as shown in FIG. 5, the lead outlet grooves 25 in brush holder frames 2a, 3b are disposed in the left-hand side viewed from one end (the front), and as shown in FIG. 6, the lead outlet grooves 25 in brush holder frames 2b, 3a are disposed in the right-hand side viewed from one end (the front).

Thus, two types of brush holder frames having lead outlet grooves in different positions have been used in conventional brush holder assemblies, requiring two types of mold for forming the brush holder frames, and costs could not be reduced. Furthermore, it has been necessary to store the molded brush holder frames separately until assembly is performed. Furthermore, it has been necessary to check the position of the lead outlet grooves and select the brush holder frames during assembly, and there have been cases of operations failure due to incorrect assembly.

DISCLOSURE OF THE INVENTION

The present invention aims to solve the above problems and an object of the present invention is to provide a brush holder assembly enabling costs to be reduced and the occurrence of operations failure due to incorrect assembly to be prevented beforehand by constructing the brush holder frames so that they can be used regardless of the direction in which the leads are to pass out.

The brush holder assembly according to the present invention comprises:

a base made of steel plate having a passage for the insertion of a commutator;

a plurality of brush holder frames each made of insulating synthetic resin and each formed in the same shape having a brush receiving recess disposed therein so that the brush receiving recess has an opening at a first end and a closure at a second end and lead outlet grooves disposed in both sides thereof so that each has an opening at the first end, extends from the first end towards the second end and joins the brush receiving recess to the outside, the brush holder frames being secured to the base such that the openings of the brush receiving recesses face the passage and the axes of the brush receiving recesses are directed towards the central axis of the passage;

a plurality of brushes inserted into each of the brush receiving recesses by passing leads attached to the side thereof through one of the lead outlet grooves in the brush holder frames; and a plurality of brush springs disposed within each of the brush receiving recesses of the brush holder frames for applying force to the brushes in the direction of the central axis of the passage.

BEST MODE FOR CARRYING OUT THE INVENTION

The preferred embodiment of the present invention will be explained below with reference to the drawings.

Embodiment 1

Figure 1:
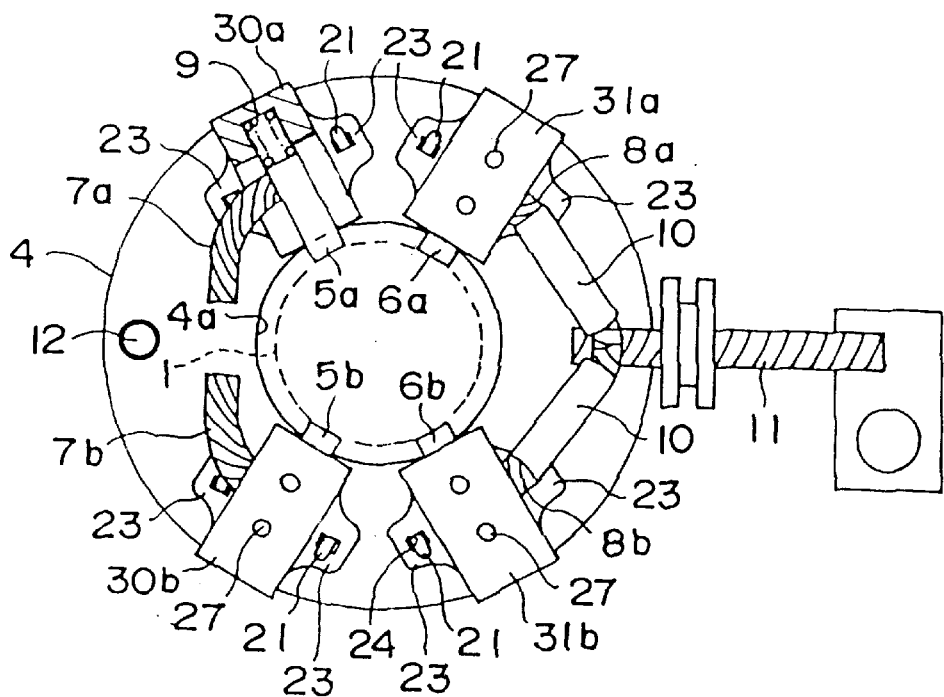
FIG. 1 is a plan of a brush holder assembly according to Embodiment 1 of the present invention.
Figure 2:
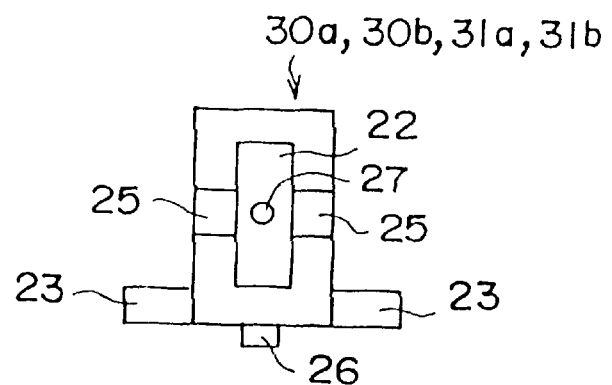
FIG. 2 is a front elevation of a brush holder frame applied to the brush holder assembly according to Embodiment 1 of the present invention.
Figure 3:
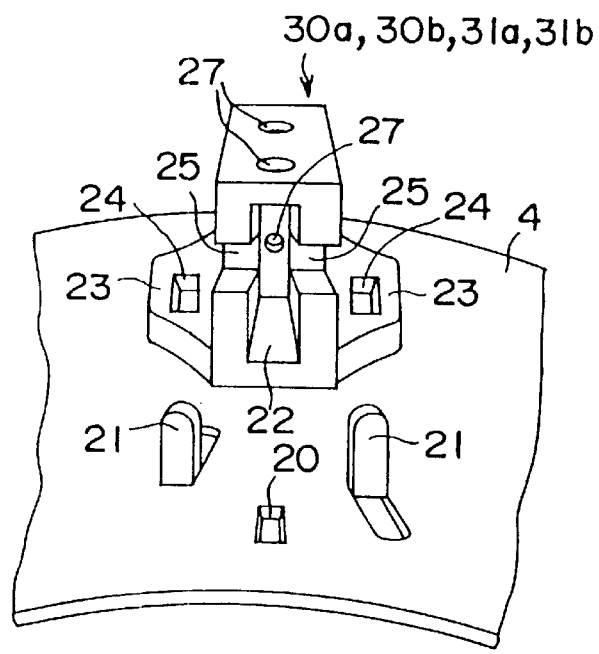
FIG. 3 is a partial perspective showing the method of mounting the brush holder frame in the brush holder assembly according to Embodiment 1 of the present invention.
Figure 4:
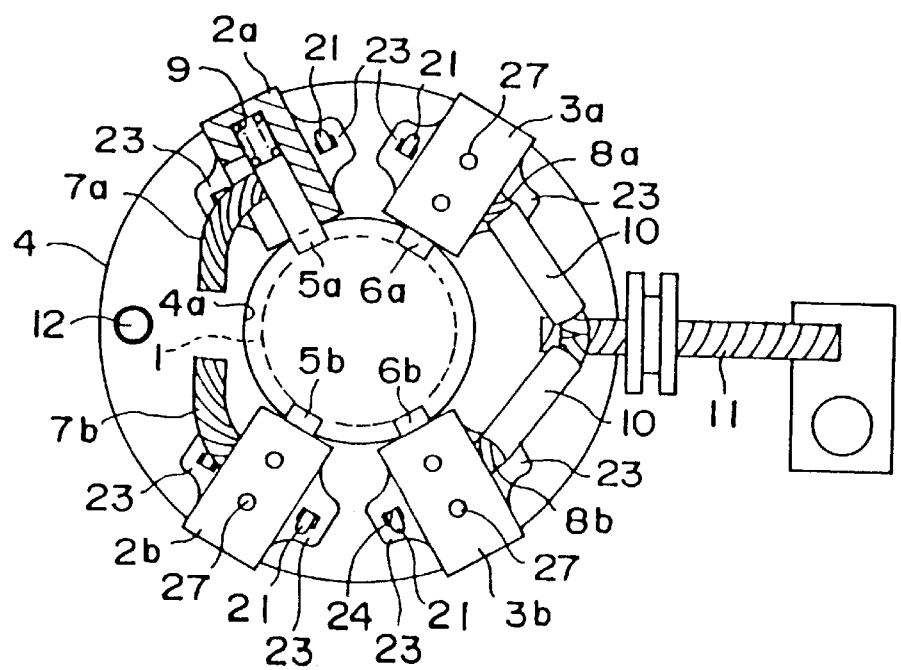
FIG. 4 is a plan of a conventional brush holder assembly.
Figure 5:
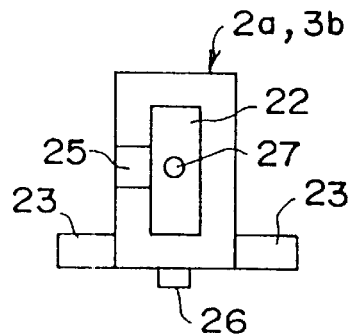
FIG. 5 is a front elevation of one of the brush holder frames applied to the conventional brush holder assembly.
Figure 6:
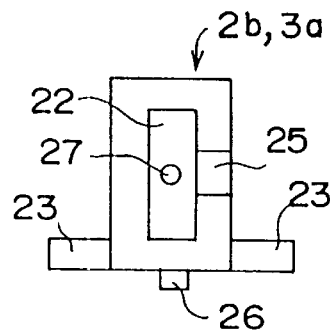
FIG. 6 is a front elevation of the other brush holder frame applied to the conventional brush holder assembly.
Figure 7:
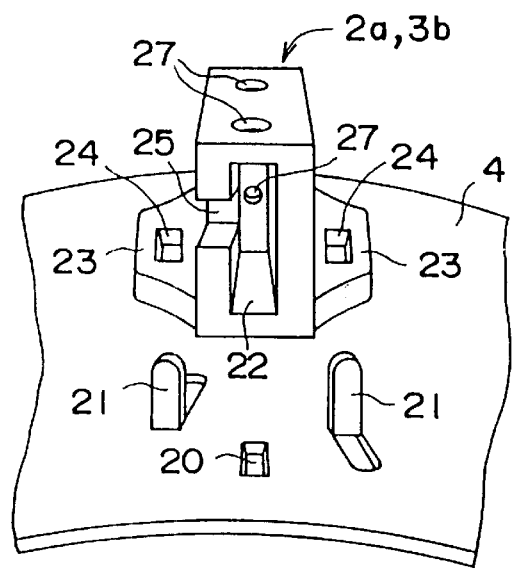
FIG. 7 is a partial perspective showing the method of mounting a brush holder frame in a conventional brush holder assembly.

FIG. 1 is a plan of a brush holder assembly according to Embodiment 1 of the present invention, FIG. 2 is a front elevation of a brush holder frame applied to the brush holder assembly according to Embodiment 1 of the present invention, and FIG. 3 is a partial perspective showing the method of mounting the brush holder frame in the brush holder assembly according to Embodiment 1 of the present invention.

A brush holder assembly comprises a pair of negative-side brush holder frames 30a, 30b and a pair of positive-side brush holder frames 31a, 31b fastened to a base 4.

The base 4 is a steel plate formed into an annulus having a central opening 4a being designed as a passage to allow insertion of a commutator 1. A plurality of positioning holes 20 are disposed on the base 4. In addition, a plurality of tabs 21 are provided by press working part of the base 4.

Furthermore, the brush holder frames 30a, 30b, 31a, 31b are molded from electrically-insulating synthetic resin, and as shown in FIG. 2, brush receiving recesses 22 are disposed therein, so as to extend from a first end towards a second end without penetrating the second end. Furthermore, pairs of flanges 23 are disposed such that each extends outwards from the bottom end on either side. Fastening slots 24 are disposed on each pair of flanges 23. Furthermore, lead outlet grooves 25 are disposed on both sides so as to extend from the first end towards the second end and join the brush receiving recess 22 to the outside. Furthermore, a plurality of protrusions 26 for positioning project from the bottom surface. In addition, a plurality of radiator openings 27 are provided.

The brush holder frames 30a, 30b, 31a, 31b are fastened onto the base 4 by inserting the protrusions 26 into the positioning holes 20 so that the tabs 21 pass through the fastening slots 24, and bending the tips of the tabs 21 projecting from the fastening slots 24. At that point, the brush holder frames 30a, 30b, 31a, 31b are fastened to the base 4 such that the open ends of the brush receiving recesses 22 each face the central opening 4a of the base 4 and the axes of the brush receiving recesses 22 pass through the central axis of the central opening 4a of the base 4. By inserting the protrusions 26 into the positioning holes 20, movement of the brush holder frames 30a, 30b, 31a, 31b in the radial direction and in the direction of rotation is controlled. The tabs 21 securing each of the brush holder frames are bent in mutually opposite radial directions, preventing the brush holder frames from dislodging longitudinally.

Furthermore, the negative-side leads 7a, 7b are connected to the rear surface of the negative-side brushes 5a, 5b, and the positive-side leads 8a, 8b are connected to the rear surface of the positive-side brushes 6a, 6b. Brushes 5a, 6b are inserted into brush receiving recesses 22 by passing the respective leads 7a, 8b through the lead outlet grooves 25 on the left-hand side of the respective brush holder frames 30a, 31b viewed from one end (the front). Brushes 5b, 6a are inserted into brush receiving recesses 22 by passing the respective leads 7b, 8a through the lead outlet grooves 25 on the right-hand side of the respective brush holder frames 30b, 31a viewed from one end (the front). The brushes 5a, 5b, 6a, 6b are placed in contact with the outer circumferential surface of the commutator 1 inserted through the central opening 4a of the base 4 by the force of brush springs 9 disposed within each of the brush receiving recesses 22.

The negative-side leads 7a, 7b connected to the negative-side brushes 5a, 5b are grounded by connection to the base by welding, etc. On the other hand, the positive-side leads 8a, 8b connected to the positive-side brushes 6a, 6b are connected to a power source (not shown) by means of a connector 11. The positive-side leads 8a, 8b are covered with insulating tubing 10 to prevent electrical short circuiting with the base 4.

This brush holder assembly is mounted to an end bracket of a direct-current electric motor using screw holes 12 disposed in the base 4.

In this manner, according to Embodiment 1, because the lead outlet grooves 25 are disposed on both sides of the brush holder frames 30a, 30b, 31a, 31b so as to extend from the first end towards the second end and join the brush receiving recess 22 to the outside, the leads can be passed out of either the left- or the right-hand side viewed from the front of the brush holder frame.

Thus, one type of brush holder frame having the same shape can be used for all of the brush holder frames 30a, 30b, 31a, 31b. Furthermore, the molded brush holder frames can be stored together. In addition, there is no need to select the brush holder frames according to the direction in which a lead is to be passed out.

According to the present invention, because the lead outlet grooves are disposed on both sides of the brush holder frames so as to extend from the first end towards the second end and join the brush receiving recess to the outside, a single type of brush holder frame can be used regardless of the direction in which a lead is to pass out.

Thus, one type of mold for forming the brush holder frames is sufficient, allowing costs to be reduced.

Furthermore, the molded brush holder frames can be stored together, allowing reductions in the number of parts and facilitating parts control.

Furthermore, there is no need to select a brush holder frame according to the position where the brush holder frame will be mounted on the base, improving the assembly operation and preventing operations failure due to incorrect assembly.

What is claimed is:

1. A brush holder assembly, comprising:

a base made of steel plate having a passage for the insertion of a commutator;

a plurality of brush holder frames each made of insulating synthetic resin and each formed in the same shape having a brush receiving recess disposed therein so that said brush receiving recess has an opening at a first end and a closure at a second end and lead outlet grooves disposed in both sides thereof so that each has an opening at said first end, extends from said first end towards said second end and joins said brush receiving recess to the outside, said brush holder frames being secured to said base such that said openings of said brush receiving recesses face said passage and the axes of said brush receiving recesses are directed towards the central axis of said passage;

a plurality of brushes inserted into each of said brush receiving recesses by passing leads attached to the side thereof through one of said lead outlet grooves in said brush holder frames; and a plurality of brush springs disposed within each of said brush receiving recesses of said brush holder frames for applying force to said brushes in the direction of the central axis of said passage.

2. A brush holder assembly, comprising:

a metal base have a passage for insertion of a commutator;

a plurality of brush holder frames, each made of insulating resin, and each formed in a same shape and having a brush receiving recess disposed therein so that the brush receiving recess has an opening at a first end and a closure at a second end and lead outlet grooves disposed in both sides thereof so that each groove has an opening at the first end, extends from the first end towards the second end, and joins the brush receiving recess to the outside; the brush holder frames being secured to the base such that the openings of the brush receiving recesses face said passage and respective axes of said brush receiving recesses are directed towards a central axis of said passage;

a plurality of brushes inserted into each of the brush receiving recesses and having leads attached to a side thereof through one of the lead outlet grooves in the brush holder frames; and a plurality of brush springs disposed within each of the brush receiving recesses of the brush holder frames for applying force to the brushes in the direction of the central axis of the passage.

3. The brush holder assembly according to claim 2, wherein each of said plurality of brush springs are helical springs aligned in the direction of the respective axis of said brush receiving recess.

* * * * *